March 24, 1964 H. RUSKIN 3,125,994
CUTTER CARRIER FOR PENCIL SHARPENER AND
METHOD OF ASSEMBLY OF CUTTERS
Filed Nov. 21, 1958 2 Sheets-Sheet 1
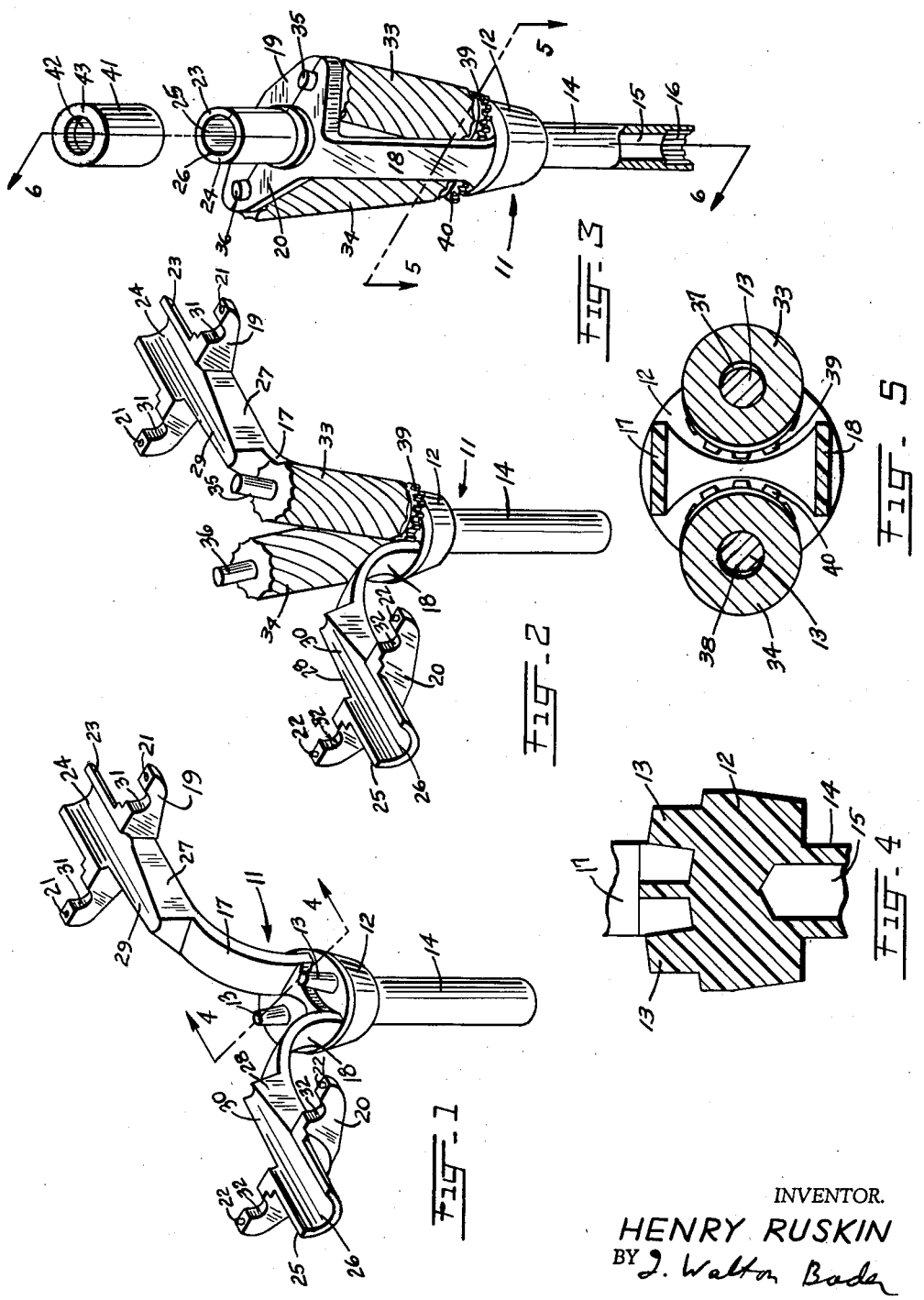
INVENTOR.
HENRY RUSKIN
BY J. Walton Bode
ATTORNEY March 24, 1964
H. RUSKIN
3,125,994
CUTTER CARRIER FOR PENCIL SHARPENER AND
METHOD OF ASSEMBLY OF CUTTERS
Filed Nov. 21, 1958
2 Sheets-Sheet 2
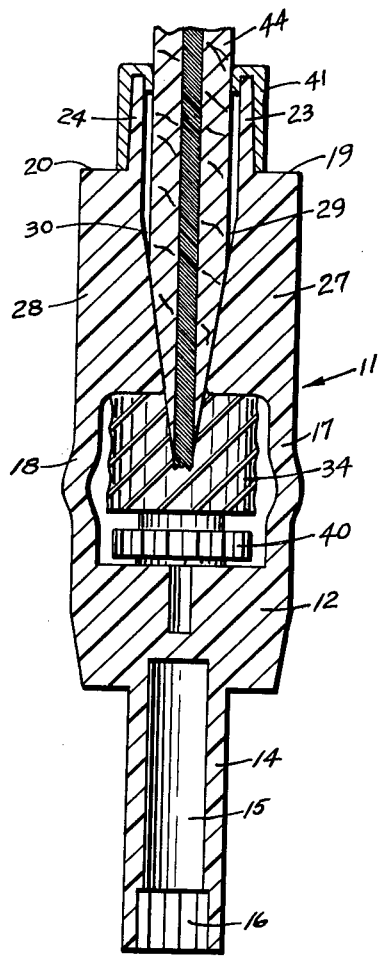
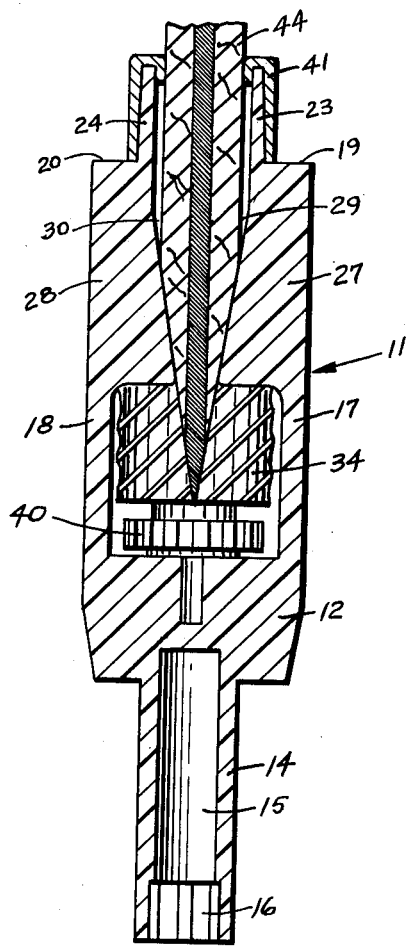
Fig. 6
Fig. 7
INVENTOR.
HENRY RUSKIN
BY J. Walter Bode
ATTORNEY United States Patent Office 3,125,994
Patented Mar. 24, 1964

3,125,994
CUTTER CARRIER FOR PENCIL SHARPENER AND
METHOD OF ASSEMBLY OF CUTTERS
Henry Ruskin, Bayside, N.Y., assignor to Swingline, Inc.,
Long Island City, N.Y., a corporation of New York
Filed Nov. 21, 1958, Ser. No. 775,595
4 Claims. (Cl. 120—96)

This invention relates to a cutter carrier for a pencil sharpener having a number of novel features.

Conventionally a cutter carrier for a pencil sharpener consists of a die cast holder portion with an axle inserted during casting. Manufacture of the holder portion is a rather difficult process. The holder portion contains a number of openings therewithin so that many difficult cams in the mold are required. In addition the use of the conventional process for the manufacture of the holder produces an excess of material secured to the molded article. This excess of material, called "flash," must be removed before the holder can be placed into use.

After casting and trimming of the conventional holder it is generally necessary to drill the holes for the axles on which the cutters rotate. However, before the axles are placed into position, the cutters must be inserted laterally in the respective holder portions and in proper alignment so that the axles can be inserted into the respective parts. Proper alignment of the cutters is difficult since the parts must be in proper spacial relationship to be operative. Furthermore since a permanent assembly must be made by driving an axle into the holder and cutter it is simple for an inexperienced operator to reverse the proper position of the cutter and produce both an inoperative device and an unsalvageable assembly.

The instant invention has for its principal objects the elimination of the defects present in conventional cutter carriers and in the manufacture thereof. The invention has other advantages as well.

The principal objects of the invention may be set forth as follows:

1. The mold for the cutter carrier, if the carrier is made in accordance with this invention, does not require the use of cams.
2. The cutter carrier can be molded without the use of axle inserts and thus can be made inexpensively.
3. Flash and cleaning are eliminated entirely.
4. Alignment of the cutters in the cutter carrier is automatic.
5. The cutters can only be assembled into the carrier in the proper manner.
6. If the arm portions of the cutter carrier is made of somewhat resilient material a simple and automatic cutter exposure control mechanism is provided wherein large cutter exposure is produced at the commencement of sharpening of the pencil with reduction of exposure as the sharpening progresses.

However, with regard to the above list of objects, the reader is cautioned that the scope of the invention is set forth in the appended claims. While the preferred construction of this invention carries out the above objects, there are constructions, within the terms of the claims, which carry out only some of the foregoing objects. Thus the listing of the objects of this invention above is not to be taken as a limitation of the scope thereof.

The instant invention, in addition to containing claims to the novel structure of the cutter carrier of this invention, also contains claims to the novel method of assembly of the cutters into the cutter carrier as disclosed herein.

A further explanation of this invention will be made by means of a detailed description thereof which will show the best mode of this invention known to the inventor for taking advantage of the same. In aid of this detailed description the specific form of the invention shown in the drawings will be referred to. However, the reader is advised that the specific form of the invention shown in such drawings are for illustrative purposes and for purposes of example only. Various changes and modifications can obviously be made within the spirit and scope of this invention and would occur to those skilled in this art.

In the drawings FIG. 1 is a perspective view of a cutter carrier for a pencil sharpener made in accordance with this invention with the arm portions thereof in the normally divergent position which they assume immediately upon manufacture.

FIG. 2 is a perspective view of a cutter carrier similar to FIG. 1 but showing the first step in the assembly of cutters therein also illustrating the first step of the novel method of this invention.

FIG. 3 is a perspective view of a cutter carrier showing the cutters in position and the arms deformed into non-divergent relationship. The ferrule which may be used to hold the arms in such relationship is shown in exploded view.

FIG. 4 is a sectional view taken along lines 4—4 of FIG. 1.

FIG. 5 is a sectional view taken along lines 5—5 of FIG. 3.

FIG. 6 is a sectional view taken along lines 6—6 of FIG. 3, (but with the ferrule in operative relationship) and on an enlarged scale showing the position that the arms assume if they are made of resilient material and if a pencil is forced into the carrier to increase the normal spacing of the exposure control portions on the arm members.

FIG. 7 is a sectional view similar to FIG. 6 but showing the position assumed by the arm members after the pencil has been sharpened and force is no longer applied to the exposure control portions.

Referring now to the specific form of the invention shown in the drawings the cutter carrier 11 is formed with a rotatable support member 12. A pair of spaced primary cutter bearings 13 are disposed upon support member 12. Bearings 13 are angularly disposed with respect to one another and determine the proper angular relationship of the cutters to one another. A main shaft bearing member 14 is centrally disposed upon support 12 and is provided with a recess 15 therewithin. A spline 16 is found at the terminal portion of recess 15 adapted to hold a mating portion (not shown) upon an operating handle (not shown).

A pair of spaced normally divergent deformable arm members 17 and 18 are secured at one end thereof to support member 12. A flange section 19 is disposed at the other end of arm 17 and a mating flange section 20 is disposed at the other end of arm 18. Flange section 19 is formed with spaced recesses 21 at its side portion and flange section 20 is formed with projecting pins 22 at its side portion. Pins 22 mate with recesses 21.

Flange section 19 also bears a forwardly projecting pencil holding member section 23 provided with a pencil holding recess 24 therewithin while flange section 20 bears a forwardly projecting complementary pencil holding member section 25 provided with a pencil holding recess 26. Flange section 19 also bears a rearwardly projecting cutter exposure control portion 27 and flange section 20 bears a rearwardly projecting cutter exposure control portion 28. Cutter exposure control portion 27 also is provided with a tapering recess 29 and cutter exposure control portion 28 is provided with a tapering recess 30. Recesses 29 and 30 are contiguous with recesses 24 and 26 and form a guide for a pencil to be sharpened.

Flange portion 19 is also provided with a pair of spaced semi-circular secondary cutter bearing sections 31 thereupon and flange portion 20 is provided with a pair of complementary spaced secondary semi-circular cutter bearing sections 32.

The cutter carrier is adapted to hold a pair of cutters 33 and 34 which are provided with axles 35 and 36 adapted to fit into bearing sections 31–32. Cutters 33 and 34 are also provided with recesses 37 and 38 which are adapted to fit over bearings 13. A pair of gears 39 and 40 are also secured to cutters 33 and 34.

A ferrule 41 is disposed over pencil holding sections 23 and 25. Ferrule 41 is formed with a recess 42 therewithin and an inwardly turned lip portion 43.

Carrier 11 may also be provided with the conventional pencil stop (not shown) which is used to prevent further sharpening of a pencil after the point is produced.

The cutter carrier of this invention may be made of a number of different materials. The preferred form of this invention is made of high impact styrene resin, vinyl resin, nylon or other thermoplastic resin. The cutter carrier can also be made of zinc, Zamac #3 alloy, or any other die-castable material.

With the description of this invention set forth the method of manufacture of the article and assembly of the cutters will now be explained. The method and assembly is slightly different if metallic material is used for the cutter carrier so the description will first be given where plastic material is used. In this case the cutter carrier is first molded and removed from the mold in the form shown in FIGS. 1 and 2. The material composing the cutter carrier can either be allowed to cool or can be further processed while still warm. The cutters 33 and 34 are then placed over primary cutter bearings 13 which, as shown in FIG. 2, determine the alignment of the cutters. Arm members 17 and 18 are then deformed and are brought into the position shown in FIG. 3. While this is done secondary bearing sections 31–32 are disposed about shafts 35 and 36 and the other mating portions of the cutter carrier are also brought into alignment. Ferrule 41 is then disposed over pencil holding sections 23 and 25 to hold the arm members in the last-named position.

If metal is to be used as the material of the cutter carrier then the arm members must be deformed in a die or fixture. This can also be done by any other conventional apparatus used to bend metals.

The securing of the arm members and associated parts into the aligned relationship shown in FIG. 3 can also be achieved by the use of adhesive disposed on the mating portions of the parts. The adhesive chosen will depend, of course, upon the material composing the parts.

FIGS. 6 and 7 show the manner in which automatic exposure control can be achieved. When resilient arm members are used in this invention the operator of the pencil sharpener, at the commencement of the operation, pushes the pencil 44 into the cutter carrier with considerable force. As shown in FIG. 6 of the drawings this pressure forces exposure control members 27 and 28 apart by deforming arm members 17 and 18 and thus increases the cutter exposure.

As the sharpening progresses, however, the deformed arm members 17 and 18 return to their original positions thus decreasing the cutter exposure. This tends to stop the sharpening at the proper point and may obviate the necessity for a pencil stop.

I claim:

1. A method of making a cutter carrier for a pencil sharpener comprising molding the arm members thereof in normally divergent relationship and molding a bearing portion and pencil holding portion in complementary sections, thence moving the arm members and complementary sections into convergent relationship, and securing said arm members to one another while in such convergent relationship.

2. A method of assembling a cutter carrier for a pencil sharpener comprising molding the arm members thereof in normally divergent relationship, molding a pair of spaced primary bearings in the form of spuds, molding a pair of spaced secondary operatively disposed bearings in the form of recesses and in complementary sections, placing cutters upon said primary bearings and in operable relationship with said secondary bearing sections, thence moving said arm members and complementary sections into convergent relationship so that said secondary bearing sections surround a portion of said cutters, and thence securing said arm members to one another while in such convergent relationship.

3. A method of assembling a cutter carrier for a pencil sharpener comprising molding the arm members thereof in normally divergent relationship, molding a pair of spaced primary bearings in angularly disposed direction to one another and in the form of spuds, molding a pair of spaced secondary operatively disposed bearings in the form of semi-circular recesses and in complementary sections, placing cutters upon said primary bearings in operable relationship with said secondary bearing sections, thence moving said arm members and complementary sections into convergent relationship so that said secondary bearing sections surround a portion of said cutters, and thence securing said arm members to one another while in such convergent relationship.

4. A cutter and carrier assembly for a pencil sharpener comprising a rotatable support member having a pair of spaced primary cutter bearings thereupon, a pair of cutters upon said support member each having an end portion operatively connected to one of said primary cutter bearings and a projecting secondary bearing axle at an opposite end portion thereof; a main shaft bearing member secured to and projecting from said rotatable support member, a pair of normally divergent deformable but resilient spaced arm members each secured at an end portion thereof to said rotatable support member, each of said arm members having a flange section at its opposite end provided with a pair of spaced semi-circular secondary bearing recesses thereupon; a projecting substantially semi-circular pencil holding member section secured to said flange section and provided with a substantially semi-circular recess therewithin, each of the flange sections and the sections disposed thereupon being complementary to the corresponding section upon the other arm member, each of said cutters being adapted to be operatively connected to one of said primary cutter bearings, its secondary bearing axle placed into alignment with a pair of complementary secondary bearing recesses, and said flange sections, secondary cutter bearing recesses and pencil holding member sections being thence brought into abutting relationship with one another so that each of said secondary bearing axles is within a secondary bearing recess; and an external holding member surrounding said pencil holding member sections when said sections are in such abutting relationship, said pencil member sections being retained in such abutting relationship by said external holding member.

References Cited in the file of this patent

UNITED STATES PATENTS

| | | |
|---|---|---|
| 518,853 | McIntyre | Apr. 24, 1894 |
| 807,757 | Martin | Dec. 19, 1905 |
| 2,160,160 | Marinsky et al. | May 30, 1939 |
| 2,432,870 | Evalt | Dec. 16, 1947 |
| 2,591,756 | Wimmer | Apr. 8, 1952 |
| 2,818,834 | Keech et al. | Jan. 7, 1958 |